(12) United States Patent
Holmberg

(10) Patent No.: US 8,499,081 B2
(45) Date of Patent: Jul. 30, 2013

(54) FACILITATING EARLY MEDIA IN A COMMUNICATIONS SYSTEM

(75) Inventor: Christer Holmberg, Kirkkonummi (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 684 days.

(21) Appl. No.: 11/813,733

(22) PCT Filed: Jan. 11, 2005

(86) PCT No.: PCT/EP2005/050100
§ 371 (c)(1),
(2), (4) Date: Oct. 7, 2009

(87) PCT Pub. No.: WO2006/074825
PCT Pub. Date: Jul. 20, 2006

(65) Prior Publication Data
US 2010/0017518 A1    Jan. 21, 2010

(51) Int. Cl.
*G06F 15/16*   (2006.01)

(52) U.S. Cl.
USPC .......................................... 709/227; 379/900

(58) Field of Classification Search
USPC .......................................... 709/227; 379/900
See application file for complete search history.

(56) References Cited

U.S. PATENT DOCUMENTS

| | | | |
|---|---|---|---|
| 2005/0105511 A1* | 5/2005 | Poikselka | 370/352 |
| 2008/0146208 A1* | 6/2008 | Ejzak et al. | 455/416 |
| 2008/0240375 A1* | 10/2008 | Chen | 379/87 |
| 2009/0285204 A1* | 11/2009 | Gallant et al. | 370/352 |
| 2009/0304173 A1* | 12/2009 | Ravishankar et al. | 379/229 |

OTHER PUBLICATIONS

G. Camarillo and H. Schulzrinne. "Early Media and Ringing Tone Generation in the Session Initiation Protocol", draft-ietf-sipping-early-media-01.txt, Nov. 18, 2003, 13 pages.*
J. Rosenberg et al. "Request for Comments (RFC) 3264: An Offer/Answer Model with Session Description Protocol (SDP)", Jun. 2002, 25 pages.*
J. Rosenberg et al. "Request for Comments (RFC) 3261: SIP: Session Initiation Protocol", Jun. 2002, 269 pages.*
"[Sipping] I-D Action:draft-ietf-sipping-early-media-01.txt", public posting made to mailing list IETF-Announce, Nov. 21, 2003, 2 pages.*
Camarillo Ericsson H Schulzrinne Columbia University G: "Early Media and Ringing Tone Generation in the Session Initiation Protocol (SIP)" IETF Standard, Internet Engineering Task Force, IETF CH, Dec. 2004, XP015009732.
Rosenberg J: "SIP Early Media" Internet Draft, Jul. 13, 2001, pp. 1-23, XP002319330.
Database WPI Section EI, Week 200501 Derwent publications Ltd., London, GB; AN 2005-009199 XP002347977 & KR 2004 073643 A (KT Corp) Aug. 21, 2004 abstract.

(Continued)

*Primary Examiner* — Jude Jean Gilles
*Assistant Examiner* — Jaren M Means

(57) ABSTRACT

A method of sending information from a Session Initiation Protocol intermediate node to a first Session Initiation Protocol terminal. The method comprises, upon receipt of a session initiation request at the Session Initiation Protocol intermediate node, establishing a first Session Initiation Protocol dialog between the Session Initiation Protocol intermediate node and the first Session Initiation Protocol terminal, sending information over said first dialog, forwarding said request from the Session Initiation Protocol intermediate node to a second, destination Session Initiation Protocol terminal, before, during, or after establishment of said first dialog, and establishing a second Session Initiation Protocol dialog, between the first and second Session Initiation Protocol terminals.

10 Claims, 5 Drawing Sheets

OTHER PUBLICATIONS

Suzuki, M. et al. A Study of Early-Media Connection Over Session Initiation Protocol Based Telephony Network. Proceedings of the 2004 IEICE Communications Society Conference, vol. 2, 2004.

Camarillo, G. The Early Session Disposition Type for the Session Initiation Protocol (SIP). Network Working Group Request for Comments: 3959, Dec. 2004.

* cited by examiner

```
UAC                     AS                      UAS

-----INVITE (offer 1)-->
<-----18x (answer 1, tag=as) ---
-----PRACK (tag=as)--------->
<-----200 (PRACK, tag=as) ----

<---Announcement played ----

------INVITE (offer 1)-------->
                        <-----200 (answer 1, tag=uas) -
<-----200 (answer, tag=uas) ----
-------ACK (tag=uas) ----------->
                        ---------- ACK (tag=uas) ----->

<~~~~~~~~~~~Media between users ~~~~~~~~~~~~~>
```

Figure 4

FACILITATING EARLY MEDIA IN A COMMUNICATIONS SYSTEM

FIELD OF THE INVENTION

The present invention relates to facilitating early media in a communications system and more particularly in a communications system which utilises the Session Initiation Protocol as the session set-up and control protocol.

BACKGROUND OF THE INVENTION

As defined by IETF RFC 3261, Session Initiation Protocol (SIP) is an application-layer control (signalling) protocol for creating, modifying, and terminating sessions with one or more participants, in an IP network. These sessions include Internet telephone calls, multimedia distribution, and multimedia conferences. SIP invitations used to create sessions carry session descriptions that allow participants to agree on a set of compatible media styles. SIP makes use of elements called proxy servers to help route requests to the user's current location, authenticate and authorise users for services, implement provider call-routing policies, and provide features to users. SIP also provides a registration function that allows users to upload their current locations for use by proxy servers. So-called "Application Servers" (ASs) can be provided in the call path, e.g. within the SIP proxy servers or elsewhere, in order to implement certain functions. SIP runs on top of several different transport protocols. SIP uses the Session Description Protocol (SDP) to specify the medium or media to be used for the session.

A SIP session is typically initiated by a SIP terminal sending a SIP INVITE message to some SIP address. Assuming that a called terminal wishes to accept the invitation, it responds to the calling terminal with a SIP 200 OK messages. The calling terminal responds to receipt of the 200 OK by sending an ACK message to the called terminal. Upon receipt of the 200 OK message (containing the called terminals SDP), the calling terminal can commence sending media to the called terminal. The called terminal can commence sending media upon receipt of the INVITE containing the caller's SDP.

When a calling SIP terminal, which might be referred to as User Equipment (UE) according to 3G terminology or as a User Agent Client (UAC), initiates a call, an AS receives the INVITE request within the SIP control network (this network might be an IP Multimedia Subsystem as defined by 3GPP). Before forwarding the request to its destination (nb. the AS may also choose not to forward the request depending on the service scenario), the AS may want to play an announcement to the UAC. In order to do this it is desirable to establish an early dialog between the UAC and AS involving the exchange of SDPs, the satisfaction of certain preconditions, and a media channel is established. The AS signals its intent to provide early media in a 18x message (where "x" has any appropriate value), the 18x including the appropriate SDP. It is noted that the AS may send multiple 18x messages, each of which may be acknowledged by the UAC with a PRACK message, prior to the AS forwarding the 200 response message to the UAC. When the announcement has been played, the AS may forward the INVITE request to the called UE, or User Agent Server (UAS), in order to continue the session setup. The UAS will then also establish a dialog with the UAC. The signalling associated with this procedure is illustrated in FIG. 1.

The AS may choose to forward the INVITE request while still playing early media, or even before starting to play media (depending upon the service). It may choose to cease the early media when a response (provisional or final) is received from the called party, or when it detects that media is received from the called pasty. Specific service implementation specifications shall define when early media shall be ceased and, if needed, define which additional mechanisms are to be used to detect media.

According to this approach to handling early media, the 18x provisional response from the AS, and the final response (200 (INVITE)) from the UAS, are received by the UAC as part of the same dialog within the session. The AS must modify the To header tag parameter received in the response message from the UAS, so as to match the tag sent by the AS in the 18x provisional response. Also, since requests (incorporated into SIP messages) may be sent from the AS to the UAC, the AS may have to modify the Cseq value in requests received from the called UE, to make sure the values in the requests forwarded to the UAC are greater than the values in requests possibly sent from the AS to the UAC. The AS will also have to handle issues related to the route set etc (i.e. parameter sets included in the SIP messages). These issues can be solved by the AS acting as a Back-to-Back User Agent (B2BUA).

A further issue which must be addressed is the need to provide two remote SDP answers to the UAC; the SDP for the early media (initiated by the AS), and the SDP from the UAS. The SDP answer cannot change within the same INVITE transaction (i.e. by sending the early media SDP in an 18x message, and the UAS SDP in the 200). There are two different solutions to this problem.

1. After the 200 OK is sent, a SIP UPDATE is sent by the AS to the UAC to provide the UAS SDP. The AS must send this UPDATE, since the UAS has no knowledge of the SDP previously sent by the AS to the UAC. The UPDATE 200 response may contain a changed SDP on the part of the UAC. However, if that is the case, the UPDATE 200 response cannot be forwarded directly to the UAS, since it was the AS that initiated the UPDATE transaction. For that the AS would have to send a separate UPDATE also towards the UAS. The 200 response for that UPDATE, sent from the UAS to the AS may also contain a change in the SDP for the UAS. Once again, the 200 response cannot be forwarded directly to the UAC, and another UPDATE to the UAC is required. This initial steps in this procedure are illustrated in FIG. 2.

The complexity of this procedure, involving as it does multiple interventions by the AS, is undesirable.

2. A second solution relies upon so-called "early media" mechanisms. As defined by the SIP recommendations, "early media" refers to media (e.g., audio and video) that is exchanged before a particular session is accepted by the called user. Within a dialog, early media may occur from the moment the initial INVITE is sent until the UAS generates a final response. Early media may be unidirectional or bi-directional, and can be generated by the caller, the callee, or both. Typical examples of early media generated by the callee are ringing tones and announcements (e.g., queuing status). Early media generated by the caller typically consists of voice commands or dual tone multi-frequency (DTMF) tones to drive interactive voice response (IVR) systems. The basic SIP specification RFC3261 supports only very simple early media mechanisms. RFC3959 extends the original proposal and overcomes a number of problems which might arise when that proposal is implemented.

Use may be made of the early session disposition mechanism described in IETF RFC3959 in order to allow an AS to play an announcement as early media. In this case two separate SDPs are used, one for the early dialog and one for the dialog with the UAS, and in this case the AS offers the early media to the UAC, which the UAC can choose to accept or reject. The initial 18x message sent from the AS to the UAC contains the SDP for the early dialog, whilst the 200 response from the UAS includes the SDP for the UAC to UAS dialog. The early dialog is terminated automatically by the UAC upon receipt of the 200 response. This procedure is illustrated in FIG. 3.

Problems may arise with this approach in the event that other nodes in the network also want to send early media. In any case, the approach has the disadvantage that it requires support for RFC3959 in the user terminals.

SUMMARY OF THE INVENTION

It is an object of the present invention to overcome or at least mitigate the disadvantages of existing approaches to providing for early media from an Application Server. This is achieved by effectively simulating the forking of a SIP dialog at an Application Server, and using the simulated fork as the bearer for the early media.

According to a first aspect of the present invention there is provided a method of sending information from a Session Initiation Protocol intermediate node to a first Session Initiation Protocol terminal, the method comprising:

upon receipt of a session initiation request at the Session Initiation Protocol intermediate node, establishing a first Session Initiation Protocol dialog between the Session Initiation Protocol intermediate node and the first Session Initiation Protocol terminal;

sending information over said first dialog, and forwarding said request from the Session Initiation Protocol intermediate node to a second, destination Session Initiation Protocol terminal, before, during, or after establishment of said first dialog, and establishing a second Session Initiation Protocol dialog, between the first and second Session Initiation Protocol terminals.

The term "Session Initiation Protocol intermediate node" used here is not intended to restrict the application of the invention to any particular Session Initiation Protocol implementation. However, one example of a Session Initiation Protocol inter mate node to which the invention may be applied is a Session Initiation Protocol Application Server.

Embodiments of the present invention may be used to send so-called early media from the intermediate node to the first Session Initiation Protocol terminal. This early media may be, for example, an announcement or tone. However, the invention may alternatively, or additionally, be used to send other information from the AS to the UAC, for example charging information. This other information may be included as a payload in a Session Initiation Protocol message sent from the intermediate node to the first terminal.

Preferably, the dialogs are distinguished by different To header tag parameters in the INVITE responses. This tag is then used in the To/From header (depending on the direction of the SIP requests) in SIP messages associated the dialogs.

Preferably, the first Session Initiation Protocol dialog is established by the Session Initiation Protocol intermediate node sending to the first Session Initiation Protocol terminal a 18x series message containing as its To header tag parameter a value generated by the intermediate node. The second dialog may be established by the second terminal sending a Session Initiation Protocol 200 response to the first terminal, the response including as its To header tag parameter a value generated by the second terminal. Alternatively, the second dialog may be established by the second terminal sending a Session Initiation Protocol 18x series massage to the first terminal, the response including as its To header tag parameter a value generated by the second terminal.

According to a second aspect of the present invention there is provided a Session Initiation Protocol intermediate node arranged to send information to a first Session Initiation Protocol terminal, the intermediate node comprising:

processing means for establishing a first Session Initiation Protocol dialog between the Session Initiation Protocol intermediate node and the first Session Initiation Protocol terminal, upon receipt of a session initiation request at the Session Initiation Protocol intermediate node;

means for sending information over said first dialog; and means for forwarding said request from the Session Initiation Protocol intermediate node to a second, destination Session Initiation Protocol terminal, before, during, or after establishment of said first dialog, and for establishing a second Session Initiation Protocol dialog, between the first and second Session Initiation Protocol terminals.

BRIEF DESCRIPTION OF THE DRAWINGS

FIG. 4 shows a SIP signalling flow for the provision of early media by a SIP Application Server making use of multiple dialogs.

DETAILED DESCRIPTION OF CERTAIN EMBODIMENTS

Figure 1:
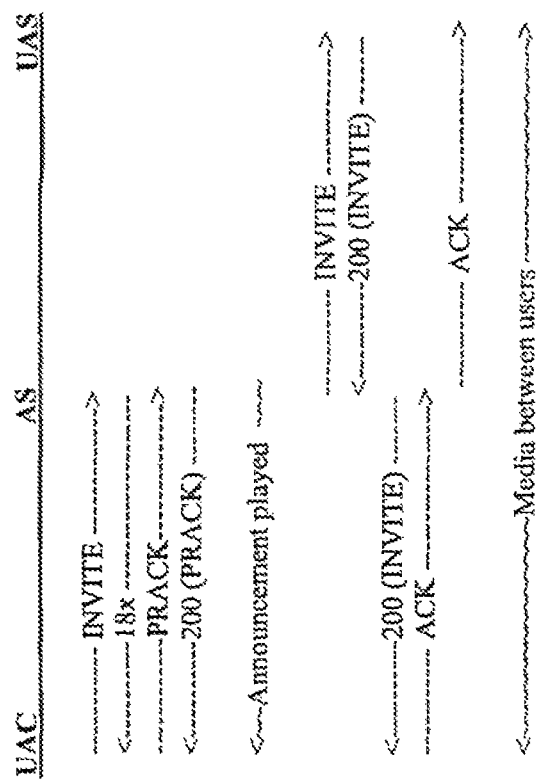
FIG. 1 shows a general SIP signalling flow for the provision of early media by a SIP Application Server.
Figure 2:
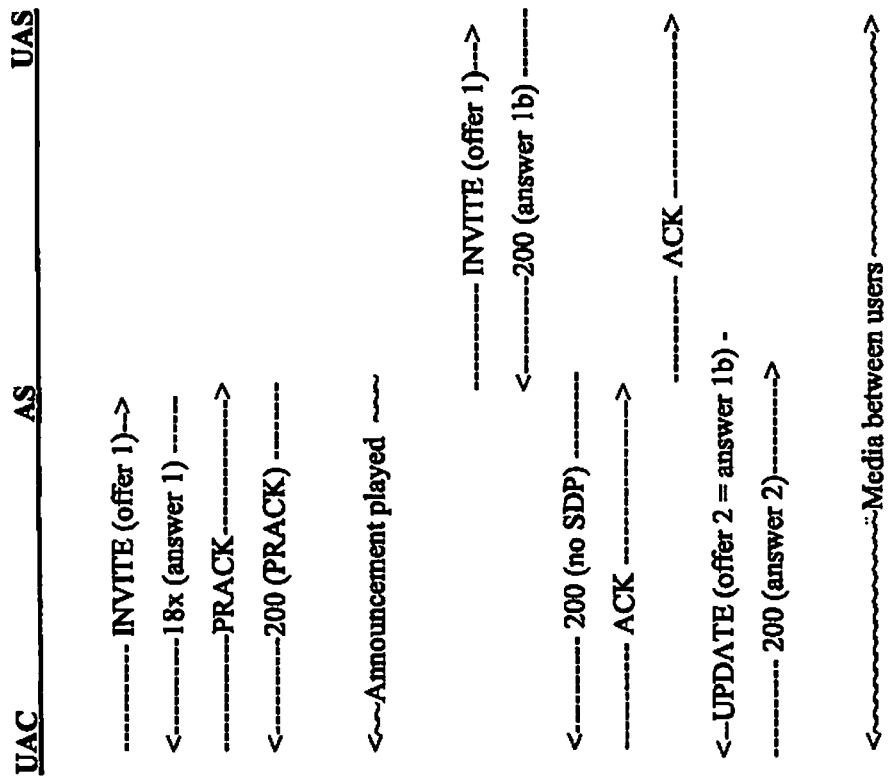
FIG. 2 shows a more detailed SIP signalling flow for the provision of early media by a SIP Application Sever including UPDATE requests.
Figure 3:
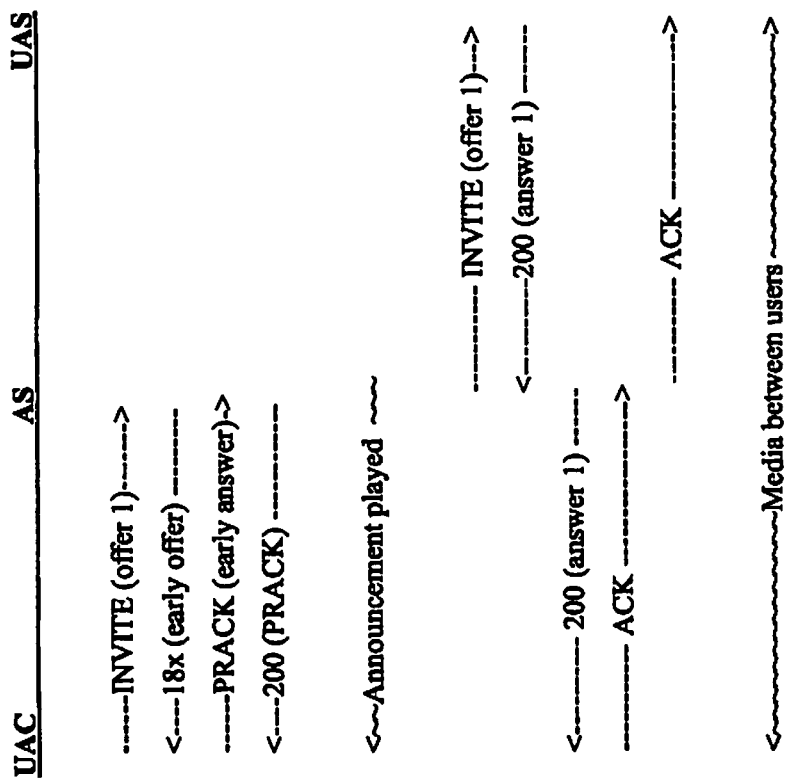
FIG. 3 shows a SIP signalling flow for the provision of early media by a SIP Application Server utilising the early session disposition mechanism.

IETF RF3261 is the technical specification for the basic Session Initiation Protocol (SIP) mechanisms. This includes provision for so-called "forking" which enables a SIP Application Server (AS) to deliver an incoming SIP Session initiation request (e.g. a SIP INVITE), initially addressed to a single SIP terminal, to two or more SIP terminals. Forking may be used for example to cause several SIP terminals (e.g. a mobile and a desk phone) to ring in response to a single session initiation request. The result of a forking procedure, assuming that two or more of the called terminals answer the request, is that multiple SIP dialogs will be established for the calling terminal. It is proposed here to provide a means for delivering early media to a calling SIP terminal from a SIP AS by effectively simulating the forking procedure at the SIP AS so as to establish multiple dialogs between the AS and the calling terminal, associated with a single SIP session.

In order to establish separate dialogs, after receipt of a SIP INVITE sent by the User Agent Client (UAC), any 18x provisional response(s) from the SIP AS, and the final response from the User Agent Server (UAS), should contain different To header tag parameters. FIG. 4 illustrates a signalling flow for this approach, where the 18x response includes the header tag "as," whilst the 200 response from the UAS includes the header tag "uas". All subsequent messages associated with each of the dialogs include the appropriate header tag.

Using this approach, the AS does not need to modify the headers of SIP messages received from the UAS, as may be required with the single dialog approach. All UAC-to-AS communication is accommodated within a separate dialog, which does not affect the UAC-UAS dialog. Whilst the AS may still act as a Back-to-Back User Agent (B2BUA) for other purposes, this is not relevant to the early media scenario.

As well as avoiding the need for the SIP AS to modify the To header tag parameter in SIP messages received from the UAS, use of the multiple dialog mechanism also makes it easier for the AS to send SIP requests to the UAC, without using a "piggybacking" mechanism or inserting SIP requests into the dialog between the UAC and UAS. This is true for as long as the early dialog between the UAC and AS exists. NB. The early dialog may be terminated by the UAC upon receipt of the 200 message from the UAS or may be maintained, depending upon the actual implementation. SIP requests may contain information generated at, or supplied to, the SIP AS. By way of example, the proposed Advice of Charge service, which is intended to provide charging information to callers, may be implemented by incorporating the charging information in SIP messages, e.g. SIP NOTIFY, sent to the UAC, the messages including the AS generated To header tag. It will be appreciated that it is not necessary to actually send early media using this procedure. Rather, the 18x message(s) may be sent to establish a first dialog which is then used, for example, exclusively for the sending of information in SIP messages.

It is noted that the early media may be provided at an even earlier stage by implementing RFC3959 may also be used if there is a desire to allow the AS to offer an early session to the UAC, rather than waiting until an answer (to the offer) has been sent by the AS to the UAC. This of course requires support for RFC3959 on the part of the terminals.

Figure 5:
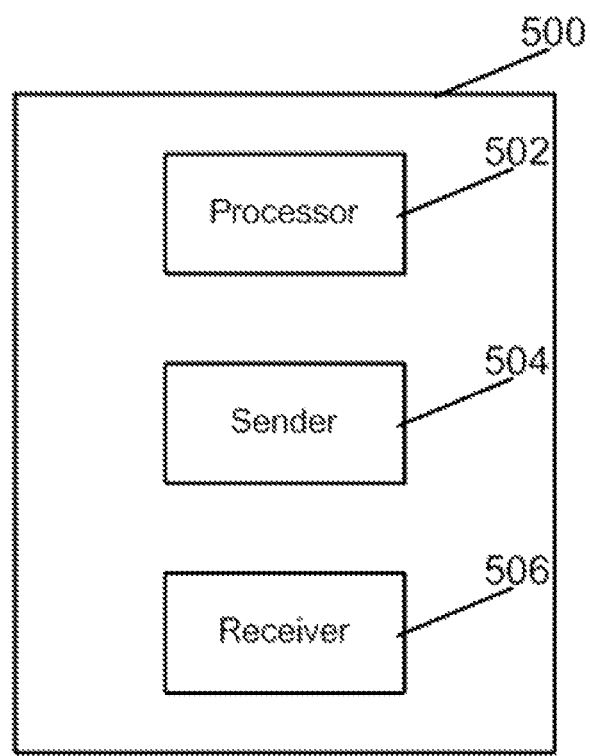
FIG. 5 depicts a high level block diagram of an embodiment of a Session Initiation Protocol (SIP) intermediate node (AS) in accordance with the present invention.

FIG. 5 depicts a high level block diagram of an embodiment of a Session Initiation Protocol (SIP) intermediate node (AS) in accordance with the present invention. AS node 500 receives a session initiation request from a first SIP terminal (not shown) at receiver 506 and processor 502 establishes a first SIP dialog between the AS and the first SIP terminal after AS 500 receives the request. Sender 504 sends information over the established first dialog and forwards the session initiation request to a second destination terminal (not shown). The request is forwarded at any time, i.e., before, during or after establishing the first dialog, to establish a second SIP dialog between the first SIP terminal and the second SIP terminal.

It will be appreciated by the person of skill in the art that various modifications may be made to the above described embodiments without departing from the scope of the present invention.

The invention claimed is:

1. A method of sending information from a Session Initiation Protocol intermediate node to a first Session Initiation Protocol terminal, the method comprising:
    upon receipt of a session initiation request at the Session Initiation Protocol intermediate node, establishing a first Session Initiation Protocol dialog between the Session Initiation Protocol intermediate node and the first Session Initiation Protocol terminal;
    sending information from the Session Initiation Protocol intermediate node to the first Session Protocol terminal over said first dialog; and
    forwarding said session initiation request from the Session Initiation Protocol intermediate node to a second, destination Session Initiation Protocol terminal, before, during, or after establishment of said first dialog, and establishing a second Session Initiation Protocol dialog, between the first and second Session Initiation Protocol terminals, wherein the first and second dialogs are distinguished by different To header tag parameters in the session initiation responses.

2. The method according to claim 1, wherein said intermediate node is a Session Initiation Protocol Application Server.

3. The method according to claim 1, wherein said information which is sent from the Session Initiation Protocol intermediate node to the first Session Initiation Protocol terminal comprises early media generated at the intermediate node or provided to that node from an external source.

4. The method according to claim 3, wherein said early media comprises an announcement or tone.

5. The method according to claim 1, wherein said information is incorporated into one or more Session Initiation Protocol messages associated with the first dialog.

6. The method according to claim 5, wherein said information comprises charging information.

7. The method according to claim 1, wherein the same To header tag parameters are subsequently used in To and From headers in Session Initiation Protocol messages associated with the first and second dialogs.

8. The method according to claim 1, wherein said first Session Initiation Protocol dialog is established by the Session Initiation Protocol intermediate node sending to the first Session Initiation Protocol terminal a 18x series message containing as its To header tag parameter a value generated by the intermediate node, and said second dialog is established by the second terminal sending a Session Initiation Protocol 200 response to the first terminal, the response including as its, To header tag parameter a value generated by the second terminal.

9. A Session Initiation Protocol intermediate node arranged to send information to a first Session Initiation Protocol terminal, the intermediate node comprising:
    a micro-processor; and
    a memory that stores processor-executable instructions where the processor interfaces with the memory and executes the processor-executable instructions to perform the following operations:
        establishing a first Session Initiation Protocol dialog between the Session Initiation Protocol intermediate node and the first Session Initiation Protocol terminal, upon receipt of a session initiation request at the Session Initiation Protocol intermediate node;
        sending information over said first dialog; and
        forwarding said request from the Session Initiation Protocol intermediate node to a second, destination Session Initiation Protocol terminal, before, during, or after establishment of said first dialog, and for establishing a second Session Initiation Protocol dialog between the first and second Session Initiation Protocol terminals by routing a response to said request from the second Session Initiation Protocol terminal to the first Session Initiation Protocol terminal without modifying the To header tag parameter.

10. The intermediate node of claim 9, wherein said intermediate node is a SIP Application Server.

* * * * *

UNITED STATES PATENT AND TRADEMARK OFFICE
CERTIFICATE OF CORRECTION

PATENT NO. : 8,499,081 B2  
APPLICATION NO. : 11/813733  
DATED : July 30, 2013  
INVENTOR(S) : Holmberg Page 1 of 1

It is certified that error appears in the above-identified patent and that said Letters Patent is hereby corrected as shown below:

In the Specification:

In Column 1, Line 20, delete "styles." and insert -- types. --, therefor.

In Column 1, Line 49, delete "request" and insert -- request, --, therefor.

In Column 1, Line 53, delete "preconditions," and insert -- pre-conditions, --, therefor.

In Column 2, Line 4, delete "pasty." and insert -- party. --, therefor.

In Column 3, Line 31, delete "dialog," and insert -- dialog; --, therefor.

In Column 3, Line 42, delete "inter mate" and insert -- intermediate --, therefor.

In Column 4, Line 26, delete "Sever" and insert -- Server --, therefor.

In Column 4, Line 41, delete "RF3261" and insert -- RFC3261 --, therefor.

In Column 4, Line 63, delete ""as,"" and insert -- "as" --, therefor.

In Column 5, Line 3, delete "UAC-UAS" and insert -- UAC-to-UAS --, therefor.

In the Claims

In Column 6, Line 35, in Claim 8, delete "its," and insert -- its --, therefor.

Signed and Sealed this  
Twenty-fifth Day of March, 2014

Michelle K. Lee  
*Deputy Director of the United States Patent and Trademark Office*